(12) United States Patent
Kolios et al.

(10) Patent No.: US 8,496,830 B2
(45) Date of Patent: Jul. 30, 2013

(54) TREATMENT OF WATER WITH HYPOBROMITE SOLUTION

(75) Inventors: Grigorios Kolios, Lörrach (DE); Jürgen Johann, Nussloch (DE); Monique Bissen, Mondsee (AT); Andreas Müller, Weil am Rhien (DE)

(73) Assignee: Christ Water Technology AG (AT)

( * ) Notice: Subject to any disclaimer, the term of this patent is extended or adjusted under 35 U.S.C. 154(b) by 630 days.

(21) Appl. No.: 12/664,972

(22) PCT Filed: Jun. 10, 2008

(86) PCT No.: PCT/EP2008/004602
§ 371 (c)(1),
(2), (4) Date: Jan. 26, 2010

(87) PCT Pub. No.: WO2009/003572
PCT Pub. Date: Jan. 8, 2009

(65) Prior Publication Data
US 2010/0187175 A1    Jul. 29, 2010

(30) Foreign Application Priority Data
Jun. 29, 2007  (DE) .......................... 10 2007 031 113

(51) Int. Cl.
*B01D 15/04*    (2006.01)
*C02F 1/42*    (2006.01)
(52) U.S. Cl.
USPC ........... 210/638; 210/188; 210/192; 210/754; 210/758
(58) Field of Classification Search
None
See application file for complete search history.

(56) References Cited

U.S. PATENT DOCUMENTS

| 5,062,966 | A | 11/1991 | Dotson et al. |
| 5,516,501 | A | 5/1996 | Kelley |
| 5,641,520 | A | 6/1997 | Howarth et al. |
| 7,083,730 | B2 * | 8/2006 | Davis ............................ 210/652 |
| 2003/0234224 | A1 | 12/2003 | Spalding et al. |

FOREIGN PATENT DOCUMENTS

| JP | 6-269785 A | 9/1994 |
| JP | 06-269785 A | 9/1994 |
| JP | 06-335688 A | 12/1994 |
| JP | 09-038670 A | 2/1997 |
| JP | 09-094585 A | 4/1997 |
| JP | 10-309588 A | 11/1998 |
| JP | 11-192482 A | 7/1999 |
| JP | 2003-012425 A | 1/2003 |
| JP | 2005-066386 A | 3/2005 |
| JP | 2005-351881 A | 12/2005 |
| JP | 2006-026496 A | 2/2006 |
| WO | 99/07642 A1 | 2/1999 |
| WO | 99-55627 A1 | 11/1999 |

OTHER PUBLICATIONS

Translation of Masayoshi et al., JP 09-038670.*
Rydzewski et al., "Organics Advanced Organics Oxidation—Removing Urea From High-Purity Water", Nov. 2003, pp. 20-26, *Ultrapure Water*.

* cited by examiner

*Primary Examiner* — Dirk Bass
(74) *Attorney, Agent, or Firm* — DLA Piper LLP (US)

(57) ABSTRACT

A process of producing ultrapure water includes passing a water stream through a plurality of treatment stages in which inorganic and organic species which are present in the water are separated from the water stream; and adding an aqueous hypobromite solution to the water stream in at least one of the stages.

13 Claims, 3 Drawing Sheets

TREATMENT OF WATER WITH HYPOBROMITE SOLUTION

RELATED APPLICATIONS

This is a §371 of International Application No. PCT/EP2008/004602, with an international filing date of Jun. 10, 2008 (WO 2009/003572 A1, published Jan. 8, 2009), which is based on German Patent Application No. 10 2007 031 113.5, filed Jun. 29, 2007, the subject matter of which is incorporated by reference.

TECHNICAL FIELD

This disclosure relates to a process for treating water, in particular for producing ultrapure water, in which a water stream is passed through a plurality of treatment stages in which inorganic and/or organic species which are present in the water are separated off. In addition, the disclosure relates to a water treatment system for carrying out such a process.

BACKGROUND

The treatment of water is currently of constantly increasing importance, in particular, in the field of obtaining drinking water and, also, in the production of high-purity process water. Particularly high demands are made of the water purity, in particular, in the latter case, for example, in the case of process waters which are required in the production of semiconductors. For instance, in semiconductor production, water having an extremely high degree of purity is required for washing silicon wafers, in particular, after etching processes.

The starting point for producing the high-purity water required is frequently surface water, for example, river water. This is purified in a multistage process comprising a pretreatment section, what is termed a "make-up" section, and what is termed a "polishing" section. The pretreatment generally comprises, in particular, one or more filtration operations for removing fine particles, a flocculation step for removing colloid substances and very fine, dirt particles, a sterilization, a softening and a desalting of the raw water. Subsequently, the water thus treated is, in the make-up section, degassed, deionized and treated with UV. A further UV treatment can be provided during polishing. In addition, the polishing generally comprises further deionization processes and also at least one ultrafiltration step.

The raw water to be treated generally contains organic constituents or impurities which must be removed as far as possible during the treatment. Occasionally, the total content of organic constituents in the raw water can even exceed a value of 5 ppm (parts per million).

For water which is intended to be used in semiconductor production, generally a maximum value of approximately 1 ppb (part per billion) of organically bound carbon, total organic carbon (TOC) is sought. Particular attention is paid here to removing nitrogenous organic compounds, in particular, urea and urea derivatives, since these have proved to be particularly interfering in semiconductor production. However, experience has shown especially that low-molecular-weight nitrogenous organic compounds may be removed only with great difficulty in conventional water treatment processes.

Surface water frequently has a very high concentration of nitrogenous organic compounds, in particular in regions utilized intensively for agriculture. In these regions the concentration of nitrogenous organic compounds in surface water is increased primarily by the intensive use of nitrogen-based fertilizer.

Rydzewski et al. (Ultrapure Water® November 2003, pages 20-26) propose adding sodium bromide and ozone to a water stream for removing nitrogenous organic compounds, in particular urea. By means of the ozone a part of the added sodium bromide is oxidized, and hypobromite is formed which in turn can react with nitrogenous organic compounds and so convert these into a state in which they can be more easily removed from the water stream. The ozone and the sodium bromide are added separately for this to the water stream, wherein according to Rydzewski et al. the sodium bromide must be added upstream of the ozone addition to achieve optimum mixing of the two components in the water stream. Rydzewski et al. found that in this manner the fraction of nitrogenous organic compounds in a water stream may in fact be effectively reduced. However, in their studies they came to the result that an efficient reduction of this fraction can only be achieved by an extraordinarily high hypobromite concentration (for a breakdown of urea from 25 ppb to 5 ppb, a hypobromite concentration of approximately 20 ppm is recommended). Correspondingly they propose adding sodium bromide and ozone to the water stream in very high amounts which of course disadvantageously greatly increases the total ionic load of the water stream. Downstream separation stages are especially occasionally considerably impaired by the ionic loading which is introduced. Furthermore, high concentrations of the strong oxidizing agent hypobromite can cause considerable material problems. In particular in the case of ozone this is moreover a relatively expensive reagent, and it must be freshly generated immediately before use with a high demand of equipment resources. Also from economic aspects, the procedure proposed by Rydzewski et al. is therefore capable of being optimized.

Separating off nitrogenous organic compounds from a water stream by means of hypobromite is also a topic of JP 09094585. From this it is known to add sodium bromide and sodium hypochlorite in combination with a flocculent to a water stream which is to be treated. Sodium hypochlorite, just as is ozone, is able to oxidize the bromide to hypobromite. In a first step the flocculent and the sodium bromide are added to the water stream. Not until after the substances which have flocculated out have been separated off by means of a filter is the sodium hypochlorite added separately to the water stream in a further step. However, this procedure already does not appear to be optimal, because a flocculation step is generally performed in a very early stage of a water treatment process, namely in the context of the pretreatment (see above). In this early stage the water stream which is to be treated still has high contamination due to impurities of all types. A targeted reaction of nitrogenous organic impurities with hypobromite is therefore impossible, which means that hypobromite must be generated in very high concentrations to ensure efficient removal thereof.

It could therefore be helpful to provide a technical solution for treating water, in particular, for producing ultrapure water in which especially the aspect of the targeted breakdown of nitrogenous organic compounds is taken into account.

SUMMARY

We provide a process of producing ultrapure water including passing a water stream through a plurality of treatment stages in which inorganic and organic species which are present in the water are separated from the water stream, and adding an aqueous hypobromite solution to the water stream in at least one of the stages.

We also provide a water treatment system that performs the process including one or more means for separating the inorganic and organic species from the water stream, and at least one device that generates hypobromite solution connected to the water stream via at least one hypobromite feed line.

DETAILED DESCRIPTION

Figure 1:
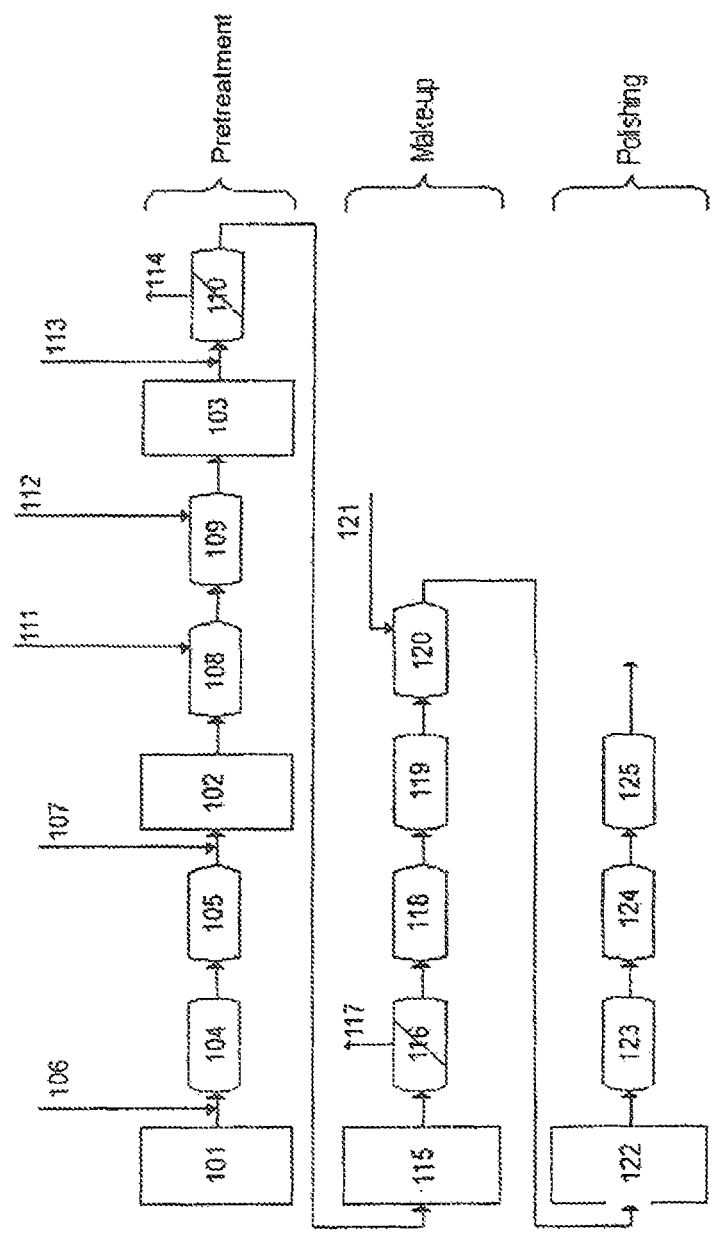
FIG. 1 shows a flowchart of a standard process for ultrapure water production by the prior art (process variant having double-stage reverse osmosis).

Our processes treat water and are suitable, in particular, for producing ultrapure water. In the process, a water stream is passed through a plurality of treatment stages in which inorganic and/or organic species which are present in the water are separated off.

In particular, the process treats water which contains nitrogenous organic compounds such as urea as impurities.

Particularly, our processes are distinguished in that an aqueous hypobromite solution is added to the water stream in at least one of the stages. The process therefore differs from the above-described prior art in that individual components which only react with one another to form hypobromite after mixing in the water stream are not added to the water stream which is to be treated. Instead, a solution which already contains hypobromite is added to the water stream. Preferably, the hypobromite formation is essentially already fully completed in the hypobromite solution. Preferably, immediately after addition of the hypobromite solution, a maximum concentration of hypobromite may be determined in the water stream, which maximum concentration is no longer exceeded downstream. The hypobromite solution is preferably added continuously to the water stream.

Surprisingly, it has been proved that by introducing this measure, the stoichiometric ratio of chemicals used to nitrogenous organic compounds to be degraded can be markedly reduced compared with the processes known from the prior art, with at least the same efficiency with regard to the breakdown of nitrogenous organic compounds in the water stream. This may be attributable to the fact that, in the case of separate addition of individual components, for example, sodium bromide and ozone or sodium hydrochloride, according to Rydzewski et al. or according to JP 09094585, respectively, the reaction for generating the hypobromite proceeds in a greatly retarded manner (or, in particular at low pH, also proceeds very incompletely), since the individual components are present in great dilution in the water stream. In both cases, the formation of hypobromite, the concentration of which is still zero immediately after the addition of the individual components, proceeds correspondingly slowly and incompletely. In contrast, in our process, a hypobromite solution which is immediately active is added to the water stream.

A hypobromite solution is to be taken to mean generally an aqueous solution which comprises $OBr^-$ ions and/or $HOBr$.

In the present case, correspondingly, the expression "hypobromite" is taken to mean $HOBr$ and/or $OBr^-$ ions.

Preferably, the hypobromite solution is produced by reaction of bromide ions from at least one inorganic bromide with at least one oxidizing agent which is able to oxidize the bromide ions. The reaction with the at least one oxidizing agent proceeds preferably in water. The inorganic bromide used can in principle be all inorganic bromine compounds which dissolve in water with the formation of bromide ions, that is to say, for example, also hydrogen bromide. Preferably, the at least one inorganic bromide is at least one salt-type bromide, in particular at least one alkali metal bromide and/or alkaline earth metal bromide. The at least one alkali metal bromide and/or alkaline earth metal bromide is sodium, bromide in particularly preferred examples. The at least one oxidizing agent is preferably a hypochlorite compound, in particular, sodium hypochlorite. The latter is preferred, in particular, also for reasons of costs since it is relatively cheap compared with ozone, for example.

Preferably, the hypobromite solution is produced as far as possible immediately prior to the addition to the water stream. This is expedient, in particular, because hypobromite, from the chemical aspect, is not very stable. In aqueous solution it can very rapidly disproportionate to bromide and bromate.

As already described at the outset, by means of the hypobromite added to the water stream, nitrogenous organic impurities which are present in the water are at least in part oxidized and can readily be removed from the water stream subsequently. In particular, urea may be reacted readily with hypobromite. In this case, inter alia, molecular nitrogen and also carbon dioxide are formed which may be removed relatively readily as gases (see Formula I):

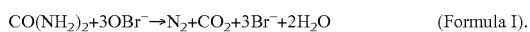

$$CO(NH_2)_2 + 3OBr^- \rightarrow N_2 + CO_2 + 3Br^- + 2H_2O \qquad \text{(Formula I)}.$$

The bromide ions formed in the reaction can (optionally together with further ions introduced into the water stream in combination with the hypobromite treatment such as, e.g., excess bromide ions from the inorganic bromide used or chloride ions from hypochlorite used) likewise readily be removed in subsequent treatment stages.

The aqueous hypobromite solution is preferably produced in a reaction vessel suitable for the generation of hypobromite (the reaction vessel will be considered in more detail hereinafter) before its addition to the water stream. Water, for example, from a separate water reservoir can be fed into the reaction vessel, to which water the at least one inorganic bromide and the at least one oxidizing agent are added. The at least one inorganic bromide and/or the at least one oxidizing agent can, for example, be added from separated storage vessels in which the reactants are present as aqueous solutions. Addition as solid is also conceivable in each case, in the case of the oxidizing agent, optionally also as a gas.

In particularly preferred examples of the process, however, the aqueous hypobromite solution which is added to the water stream to be treated is a bromide-ion-containing carrier stream to which the at least one oxidizing agent is added before it is fed into the water stream which is to be treated. The addition of the oxidizing agent proceeds as in the above process variant preferably in or upstream of a reaction vessel suitable for the generation of hypobromite, in which reaction vessel the bromide ions which are present in the carrier stream are at least partially oxidized to hypobromite.

The carrier stream is preferably fed at least in part, in particular completely, from at least one treatment stage which is connected downstream of the at least one stage in which the hypobromite solution is added to the water stream.

Particularly preferably, the carrier stream is fed from at least one of the above-mentioned downstream treatment stages in which the ions which are introduced into the water stream in combination with the hypobromite treatment are removed again. Preferably, this stage is at least one reverse osmosis stage.

It is preferred that the carrier stream is fed with retentate from the at least one reverse osmosis stage. In the retentate, the ions which are being removed are concentrated, including in the present case, in particular, also bromide ions. In this example, correspondingly, bromide ions need not obligatorily be added separately to the carrier stream. Instead, it already has a fraction of bromide ions which optionally only need to be supplemented by adding the at least one inorganic bromide. The total consumption of the at least one inorganic bromide can be kept correspondingly very low which can have a very beneficial effect on the economic efficiency of the process.

In further preferred examples of the process, the carrier stream can also be fed with retentate from the at least one reverse osmosis stage, which retentate was treated in an anion exchanger loaded with $Br^-$ ions. In the anion exchanger, for example chloride ions which are present in the retentate can be removed and replaced by bromide ions. This is expedient, for example, when the oxidizing agent used is a hypochlorite.

It is particularly preferred that the water stream, after the addition of the hypobromite solution, has a pH>8, preferably between 8 and 11, in particular between 8.5 and 9.5. It has been established that the breakdown of nitrogen compounds which are present in the water stream proceeds particularly efficiently in these ranges. The pH of the water stream is preferably controlled exclusively by the addition of a corresponding amount of hypobromite solution. It is also possible, however, to vary the pH by targeted addition of additional hydroxide solution or acid.

Before the addition of the hypobromite solution, the water stream generally preferably has an essentially neutral pH or an alkaline pH, depending on which workup stage it has passed through before the addition.

The pH of the hypobromite solution itself is generally a relatively non-critical factor. It is preferably in the alkaline range, in particular in the range between 11.5 and 13, but other deviations are also conceivable, for example in the event of use of hydrogen bromide as the at least one inorganic bromide compound.

Preferably, the hypobromite solution is added to the water stream in a volumetric ratio between 1:10 and 1:30000, preferably between 1:1.00 and 1:10000, in particular between 1:300 and 1:3000.

For production of the hypobromite solution, the at least one oxidizing agent is mixed and reacted with the bromide ions from the at least one inorganic bromide preferably in a stoichiometric ratio between 0.1 and 10, in particular between 0.5 and 2, particularly preferably between 0.8 and 1.5. These ranges are preferred, in particular, when the inorganic bromide used is an alkali metal bromide, in particular sodium bromide, and the oxidizing agent used is a hypochlorite, in particular sodium hypochlorite.

In principle, attempts are made to generate a hypobromite solution having a fraction of what is termed "free bromine" as high as possible. "Free bromine" in the present case should be taken to mean the amount of bromine, in particular in the form of HOBr and/or $OBr^-$, which can be determined by what is called the DPD method (see below). However, care should be taken to ensure that the concentration of free bromine in the solution does not exceed a value of 40 g/l.

For production of the hypobromite solution using a hypochlorite as oxidizing agent, the concentration of free chlorine (similarly to the above definition of "free bromine," "free chlorine" in the present case should be taken to mean the amount of chlorine, in particular in the form of HOCl and/or $OCl^-$, which can be determined by the above-mentioned DPD method) in the mixture of oxidizing agent and the at least one inorganic bromide is set preferably to a value between 0.12 g/l and 120 g/l, in particular between 0.3 g/l and 30 g/l, particularly preferably between 1 g/l and 15 g/l. Generally the amount of free chlorine correlates directly to the amount of added hypochlorite.

The DPD method is known. According to that method, for determination of the concentration of free chlorine or free bromine in a solution, the free bromine and the free chlorine are reacted with DPD (N,N-diethyl-1,4-phenylenediamine). The concentration of the resultant compound can be determined photometrically, for example, using a "Swan Chematest 20s" type photometer from Swan Analytische Instrumente AG, Switzerland. The free chlorine can be masked chemically before the addition of DPD and so the DPD added only reacts with the (unmasked) free bromine. The concentration of free bromine can be determined directly in this manner while the determination of the concentration of free chlorine can be made by subsequent formation of the difference.

Preferably, in the hypobromite production the at least one oxidizing agent is allowed to act on the bromide ions from the at least one inorganic bromide for between 30 and 3000 seconds, preferably between 60 and 600 seconds, in particular between 120 and 300 seconds, in particular in the above-mentioned reaction vessel suitable for the generation of hypobromite. After this time has expired, generally an equilibrium between the reactants and resultant hypobromite has formed, and the hypobromite formation is therefore essentially completed.

In the water stream itself, it is intended to keep the concentration of free bromine in principle as low as possible. However, for kinetic reasons, the establishment of a sufficiently high hypobromite concentration is necessary. The required concentration values of course depend not least on the concentration of the nitrogen compounds in the water stream which are to be removed. Generally, it is preferred, by means of the addition of the hypobromite solution, to establish a concentration of free bromine in the water stream of not greater than 10 mg/l, preferably between 1 mg/l and 10 mg/l, in particular between 2 mg/l and 5 mg/l. At these concentrations the reaction proceeds according to Formula (I) generally rapidly enough. In addition, at these concentrations, material problems as a consequence of the oxidative potential of the bromine compounds are generally not expected.

Preferably, the stoichiometric ratio of free bromine to organic nitrogen compounds in the water stream is set to a value greater than 2:1 and less than 50:1, preferably between 2:1 and 20:1, in particular between 2:1 and 10:1, particularly preferably between 5:1 and 10:1. An efficient removal of organic nitrogen compounds at such a low concentration of free bromine is not known to date from the prior art.

Preferably, a reducing agent is added after a time of action to the water stream which was admixed with the hypobromite solution, which reducing agent is able, in particular, to reduce hypobromite ions and hypochlorite ions. The addition of the reducing agent is intended, in particular, to reduce excess hypobromite and hypochlorite to bromide ions and chloride ions. These do not any longer have a corrosive action, in particular towards polymeric materials, and can readily be removed in downstream treatment stages.

The time of action mentioned is the time in which the hypobromite added to the water stream is allowed to act on the organic nitrogen compounds which are contained in the water stream. Preferably, the time of action is between 1 minute and 1 hour, in particular between 2 minutes and 30 minutes, particularly preferably between 10 minutes and 20 minutes.

The reducing agent, in particularly preferred examples, is hydrogen peroxide. Hydrogen peroxide is particularly suitable since, as a nonionic compound, it can react to completion with hypobromite or with hypochlorite in a virtually "residue-free" manner. Optionally, excess hydrogen peroxide can be removed without problems in a subsequent stage, for example by means of UV irradiation.

Alternatively, or additionally to, the hydrogen peroxide, for example reducing sulfur compounds, for example thio sulfates or in particular also sodium bisulfite ($Na_2S_2O_5$), can also be added to the water stream as reducing agent.

A not unimportant aspect of the process is the positioning of the hypobromite treatment stage within the overall process of water treatment. Preferably, a process comprises a pretreatment section, a make-up section and a polishing section as have already been described at the outset. Within this chain, the aqueous hypobromite solution is added to the water stream which is to be treated preferably at the end of the pretreatment section or at the start of the make-up section. Preferably, upstream of the addition of the hypobromite solution, there are arranged as treatment stages at least one filtration of the water stream using a multimedia filter (in particular for separating off flocculated impurities) and/or at least one filtration of the water stream using an activated carbon filter and/or at least one treatment in an ion exchanger and/or at least one reverse osmosis stage, all these stages, in particular, being within the pretreatment section. Downstream of the addition of the hypobromite solution (and also, preferably, also of the addition of the at least one reducing agent), there are arranged preferably at least one reverse osmosis stage (as already mentioned above) and/or at least one degassing treatment and/or at least one UV treatment and/or at least one treatment in an ion exchanger (in particular in a mixed-bed ion exchanger) and/or at least one ultrafiltration. Such a positioning ensures that, at the time point of the addition of the hypobromite solution, the water stream which is to be treated is already freed from a substantial part of the impurities which were originally present. This has the advantage that the reaction of the organic nitrogen compounds which are contained in the water with the hypobromite can proceed substantially unimpaired by further ionic and nonionic constituents, and so the hypobromite concentration can be kept relatively low.

Our water treatment systems comprise one or more means for separating off inorganic and/or organic species from a water stream. Particularly, a water treatment system is distinguished by at least one device for generating hypobromite solution which is connected to the water stream via at least one hypobromite feed line.

The device for generating hypobromite solution comprises preferably at least one reaction vessel suitable for generating hypobromite and/or at least one storage vessel for at least one inorganic bromide and/or at least one storage vessel for at least one oxidizing agent, which has the property to oxidize the at least one inorganic bromide. The storage vessels are connected to the reaction vessel via one or more feed lines. As regards preferred examples of the at least one inorganic bromide and the at least one oxidizing agent, reference can be made to the corresponding details above. Preferably, the at least one inorganic bromide and the at least one oxidizing agent are present in the storage vessels in the form of their aqueous solutions. The at least one reaction vessel preferably comprises means for mixing these aqueous solutions.

The oxidation of the at least one inorganic bromide to hypobromite proceeds in the at least one reaction vessel. The residence time of the mixture of inorganic, bromide and oxidizing agent in the reactor is preferably between 30 and 3000 seconds, as already defined above.

Preferably, a water treatment system comprises at least one storage vessel for at least one reducing agent, in particular, for a reducing agent which is able to reduce hypobromite and hypochlorite. In this case, the at least one storage vessel for the reducing agent is connected to the water stream preferably via at least one reducing agent feed line downstream of the at least one hypobromite feed line. With regard to preferred examples of the at least one reducing agent, likewise reference can be made to corresponding details above.

Particularly preferably, a water treatment system comprises an, oxidation reactor which is arranged downstream of the hypobromite feed line and is arranged upstream of the reducing agent feed line. In the oxidation reactor, the reaction of the above-mentioned nitrogenous organic compounds with the hypobromite added to the water stream essentially proceeds. The hypobromite is allowed to act on the nitrogen compounds in the oxidation reactor over the above-defined time of action. The at least one oxidation reactor can comprise means for mixing the water stream to ensure efficient degradation of the nitrogen compounds.

Preferably, a system comprises, as means for separating off inorganic and/or organic species from the water stream, at least one filtration unit and/or at least one ion-exchange unit and/or at least one reverse osmosis unit which is or are arranged upstream of the hypobromite feed line.

In addition, it is preferred that a system comprises, as means for separating off inorganic and/or organic species from the water stream, at least one reverse osmosis unit and/or at least one degassing unit and/or at least one UV treatment unit and/or at least one ion-exchange unit and/or at least one ultrafiltration unit which is or are arranged downstream of the hypobromite feed line.

In the present case, in particular multimedia filters and activated-carbon filters are used as filtration units. The at least one ion-exchange unit can comprise not only cation and anion exchangers, but also mixed-bed ion exchangers.

Particularly preferably, a water treatment system comprises at least one reverse osmosis unit which is arranged downstream of the at least one reducing agent feed line and which is connected to the at least one device for generating hypobromite solution via a return line. Preferably bromide-containing retentate as carrier stream can be transferred from the at least one reverse osmosis unit to the at least one reaction vessel suitable for generating hypobromite via the return line. By introducing oxidizing agent into the reaction vessel, the bromide in the carrier stream can be oxidized. The hypobromite-containing carrier stream thus obtained can subsequently be added to the water stream which is to be treated.

A filtration unit, in particular in the form of a cartridge filter, can be connected upstream of the at least one reverse osmosis unit which is arranged downstream of the at least one reducing agent feed line, in which filtration unit excess reducing agent and/or chlorine and/or bromine can be decomposed. As such, in particular an activated-carbon filter is suitable.

In addition, it can be preferred that the system comprises an anion exchanger which is loaded with $Br^-$ ions for purifying the retentate from the reverse osmosis unit which is arranged downstream of the at least one reducing agent feed line. The anion exchanger is expediently arranged between the reverse osmosis unit and the at least one device for generating hypobromite solution. Upstream of the introduction of the carrier stream into the reaction vessel which is suitable for generating hypobromite, the carrier stream can be treated by means of the anion exchanger loaded with Br⁻ ions, and so, for example, Cl⁻ ions and/or OH⁻ ions which may be contained in the carrier stream are replaced by Br⁻ ions.

Other features result from the description hereinafter of preferred examples. In this case, the individual features can be implemented in each case separately or as a plurality in combination with one another in an example. The particular examples described serve only for illustration and for better understanding and are in no way to be taken as restricting.

FIG. 1 shows a standard process for ultrapure water production according to the prior art. The process is subdivided into three sections, that is to say the pretreatment, the make-up and the polishing.

For the pretreatment, the water which is to be treated is transferred from the reservoir 101 via the filtrate water tank 102 into the tank for deionized water 103. Between the reservoir 101 and the filtrate water tank 102, it flows through a multimedia filter 104 and an activated-carbon filter 105. Before introduction into the multimedia filter 104, a flocculent can be added to the water via the feed line 106, and before introduction into the filtrate water tank 102, a biocide via the feed line 107. The cation exchanger 108 and the anion exchanger 109 are arranged downstream of the filtrate water tank 102. Downstream of the tank for deionized water 103, the water is introduced into a reverse osmosis unit 110 for completion of the pretreatment. Via the feed lines 111, 112 and 113, acid (111) or hydroxide solution (112 and 113) are added as required. Via the outlet line 114, retentate from the reverse osmosis unit 110 is removed. The pretreated water is subsequently transferred to the water reservoir 115.

For makeup, the water is passed from the clean water reservoir 115 into a further reverse osmosis unit 116 (what is shown here is a process variant having double-stage reverse osmosis; in the case of variants having single-stage reverse osmosis, only the reverse osmosis unit 110 is provided). Via the outlet line 117, retentate is removed from the reverse osmosis unit 116. Downstream of the reverse osmosis unit 116, the water is treated in a degassing unit 118, a UV treatment unit 119 and in a mixed-bed ion exchanger 120. Via the feed line 121, acid and/or hydroxide solution is added as required. The water is subsequently transferred to the water reservoir 122.

For the polishing, the water is finally further transferred to the ultrafiltration unit 125 via the UV treatment unit 123 and the mixed-bed ion exchanger 124. Subsequently, the water can be fed to its use.

Figure 2:
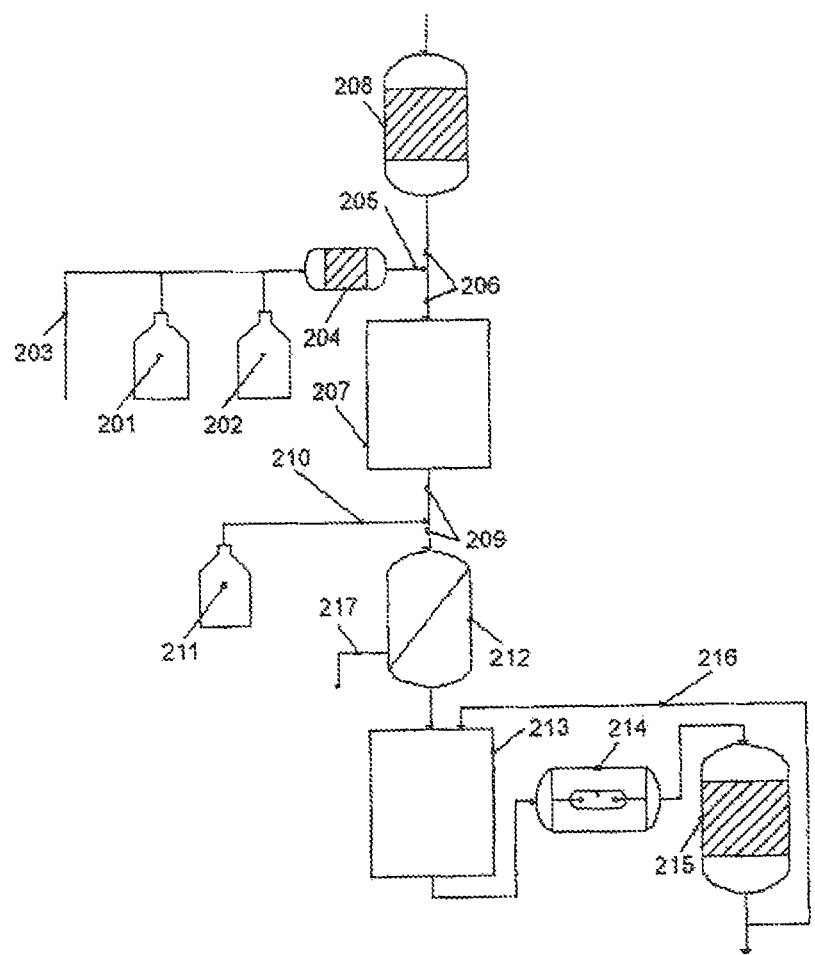
FIG. 2 shows a flowchart of a process section of an example of a process for producing ultrapure water.

In FIG. 2, a process section is shown of an example of our process for producing ultrapure water. From a storage vessel 201, NaOCl is fed as oxidizing agent and from a storage vessel 202, NaBr is fed to a carrier stream 203 fed from a reservoir which is not shown, which in turn is passed into a reaction vessel 204 suitable for generating hypobromite. The outflow of the reaction vessel 204 is connected via a hypobromite feed line 205 to the water stream 206 which is to be treated and which exits from the ion exchanger 208. The water stream is already substantially deionized and freed from natural organic compounds such as humic, fluvic and other organic acids, but still has a fraction of organic nitrogen compounds. These are very largely broken down in the oxidation reactor 207 by reaction with the hypobromite. In the outflow 209 of the oxidation reactor 207, $H_2O_2$ can be added via the reducing agent feed line 210 as reducing agent from the storage vessel 211. Subsequently, the water stream is passed via a reverse osmosis unit 212, a permeate water tank 213 of a UV oxidation unit 214 and a mixed-bed ion exchanger 215. In these, the ion loading introduced into the water stream in the context of the hypobromite treatment and also degradation products of organic nitrogen compounds can be removed. A substream 216 is recirculated from the outflow of the mixed-bed ion exchanger 215 to the permeate water tank 213. As a result, the water stream is relatively weakly ionized at the entrance to the UV oxidation unit 214, and so optimum transmission of the UV radiation is achieved.

Figure 3:
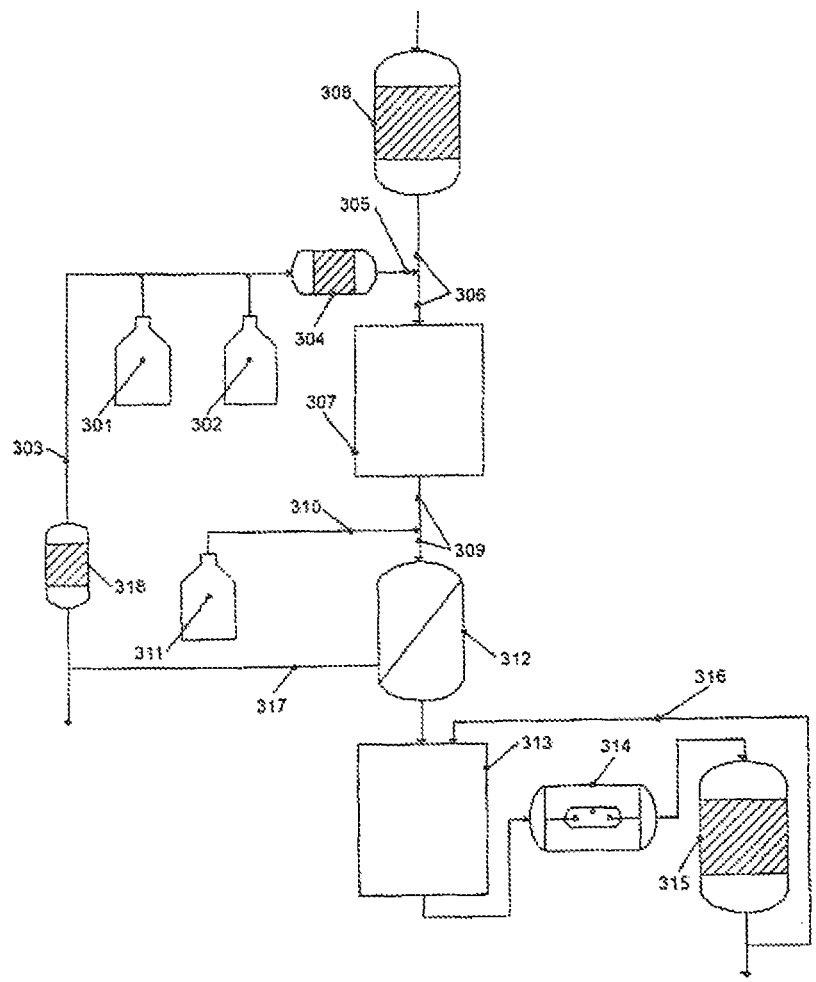
FIG. 3 shows a flowchart of a process section of an example of a process for producing ultrapure water (variant having partial recycling of the retentate from a reverse osmosis stage and ion exchange via $Br^-$ loaded ion exchanger).

In FIG. 3, a process section of a further example of our process for producing ultrapure water is shown. This differs only in partial aspects from the example shown in FIG. 2. The carrier stream 303 is not fed from a separate reservoir but with retentate from the reverse osmosis unit 312. NaOCl is added to the carrier stream from the storage vessel 301 as oxidizing agent and NaBr from the storage vessel 302. Subsequently, the carrier stream is passed to the reaction vessel 304 for generation of hypobromite. The resultant hypobromite solution is metered via the hypobromite feed line 305 into the water stream 306 which is to be treated and which exits from the ion exchanger 308. In the oxidation reactor 307, the reaction of the hypobromite with organic nitrogen compounds which are present in the water stream proceeds. In the outflow 309 of the oxidation reactor 307, $H_2O_2$ as reducing agent is added from the storage vessel 311 via the reducing agent feed line 310. In the reverse osmosis unit 312 and the mixed-bed ion exchanger 315 which are connected downstream of the oxidation reactor 307, in particular the ionic loading introduced into the water stream in the context of the hypobromite treatment and also breakdown products of organic nitrogen compounds are removed. The UV oxidation unit 314 serves in particular for further reduction of the TOC content in the water stream. In principle, the permeate from the reverse osmosis unit 312 is processed identically to the process variant as shown in FIG. 2. The retentate from the reverse osmosis unit 312 contains, inter alia, bromide ions and chloride ions (from NaOCl and NaBr). The chloride ions can be removed and replaced by bromide ions in the optional ion exchanger 318 which is loaded with Br⁻ ions. Downstream of the ion exchanger 318, the carrier stream 303 thus essentially comprises only bromide ions. Less NaBr needs to be added to the carrier stream 303 from the storage vessel 302 in accordance with the concentration of bromide ions.

The invention claimed is:
1. A process of producing ultrapure water comprising:
passing a water stream through a plurality of treatment stages in which inorganic and organic species which are present in the water are separated from the water stream; and
adding an aqueous hypobromite solution to the water stream after the water stream is passed through at least one filtration stage and/or at least one ion-exchange stage and/or at least one reverse osmosis stage and wherein 1) the water stream is passed through at least one reverse osmosis stage after addition of the hypobromite solution and 2) by the addition of the hypobromite solution, a stoichiometric ratio of free bromine to organic nitrogen compounds in the water stream is greater than 2:1 and less than 50:1.

2. The process as claimed in claim 1, further comprising producing the hypobromite solution by reaction of bromide ions from at least one inorganic bromide with at least one oxidizing agent which is able to oxidize the at least one inorganic bromide.

3. The process as claimed in claim 1, wherein the aqueous hypobromite solution which is added to the water stream is a bromide-ion-containing carrier stream to which the at least one oxidizing agent is added before it is fed into the water stream.

4. The process as claimed in claim 3, wherein the water stream is fed at least in part from a treatment stage which is arranged downstream of the at least one stage in which the hypobromite solution is added to the water stream.

5. The process as claimed in claim 4, wherein the water stream is fed with retentate from at least one reverse osmosis stage.

6. The process as claimed in claim 4, wherein the water stream is fed with retentate from at least one reverse osmosis stage, which retentate was treated in an anion exchanger loaded with Br⁻ ions.

7. The process as claimed in claim 1, wherein the water stream, after addition of the hypobromite solution, has a pH between 8 and 11.

8. The process as claimed in claim 1, wherein the hypobromite solution is added to the water stream in a volumetric ratio between 1:10 and 1:30000.

9. The process as claimed in claim 1, wherein the hypobromite solution is added to the water stream in a volumetric ratio between 1:300 and 1:3000.

10. The process as claimed in claim 1, wherein, by means of the addition of the hypobromite solution, a concentration of free bromine in the water stream of between 1 mg/l and 10 mg/l is established.

11. The process as claimed in claim 1, wherein, by means of the addition of the hypobromite solution, a concentration of free bromine in the water stream of between 2 mg/l and 5 mg/l is established.

12. The process as claimed in claim 1, further comprising adding a reducing agent after a time of action to the water stream which was admixed with the hypobromite solution, which reducing agent is able to reduce hypobromite ions and hypochlorite ions.

13. The process as claimed in claim 12, wherein the reducing agent is hydrogen peroxide.

* * * * *